United States Patent [19]

Suzuki

[11] Patent Number: 4,557,580
[45] Date of Patent: Dec. 10, 1985

[54] BEAM SPLITTER FOR A SINGLE LENS REFLEX CAMERA

[75] Inventor: Takashi Suzuki, Yokohama, Japan

[73] Assignee: Canon Kabushiki Kaisha, Tokyo, Japan

[21] Appl. No.: 633,072

[22] Filed: Jul. 23, 1984

Related U.S. Application Data

[63] Continuation of Ser. No. 407,765, Aug. 13, 1982, abandoned.

[30] Foreign Application Priority Data

Aug. 18, 1981 [JP] Japan .................................. 56-129169

[51] Int. Cl.⁴ .......................... G03B 7/00; G03B 19/12
[52] U.S. Cl. ..................................... 354/406; 354/476; 354/479
[58] Field of Search .................... 354/56, 59, 152, 22, 354/23 R, 479, 406, 476

[56] References Cited

U.S. PATENT DOCUMENTS

| | | | |
|---|---|---|---|
| 3,280,714 | 10/1966 | Gunther et al. | 354/479 |
| 4,081,807 | 3/1978 | Urano et al. | 354/152 |
| 4,302,089 | 11/1981 | Fukuhara | 354/152 |
| 4,461,557 | 7/1984 | Kimura | 354/479 |

Primary Examiner—L. T. Hix
Assistant Examiner—Douglas S. Lee
Attorney, Agent, or Firm—Fitzpatrick, Cella, Harper & Scinto

[57] ABSTRACT

A beam splitter for a single lens reflex camera is provided which divides the light beam from a picture-taking lens into two light beams and directs one light beam to a view-finder system and the other light beam onto a one-dimensional or two-dimensional array sensor. In the beam splitter, metal reflecting films in the form of dots or slits of uniform or non-uniform size are regularly or irregularly arranged on the surface of a transparent substrate. The area ratio of the metal reflecting films is made minimum in the neighborhood of the optical axis of the picture-taking lens, whereby the average transmission factor in the neighborhood of the optical axis is made maximum.

6 Claims, 10 Drawing Figures

PRIOR ART

BEAM SPLITTER FOR A SINGLE LENS REFLEX CAMERA

This application is a continuation of application Ser. No. 407,765 filed Aug. 13, 1982, now abandoned.

BACKGROUND OF THE INVENTION

This invention relates to a beam splitter for a single lens reflex camera. More particularly, the present invention relates to a beam splitter having the function of directing an imaging light beam toward a viewfinder and in addition, directing part of the imaging light beam to the rear of a mirror (toward a film).

The present invention further relates to a beam splitter which differs from an amplitude dividing type beam splitter using a dielectric material multi-layer film and which may be called the wave surface dividing type or the area type. The present invention also relates to a beam splitter suitable for use in a camera having a device for detecting image information by a digital sensor array after the image information has been transmitted through the beam splitter.

Systems are known in which a light-transmitting portion in the form of a spot or a slit is provided on a quick return mirror for the purpose of metering and part of an imaging light beam is directed to a light-receiving element installed rearwardly of the quick return mirror to effect metering (Japanese Utility Model Publication No. 29793/1969, U.S. Pat. No. 4,081,807, Japanese Laid-open Patent Application No. 119030/1978, etc.).

The reason why the area type beam splitter is used as the quick return beam splitter is that, in the case of a half-mirror, both reflected light and transmitted light are colored or polarized and this leads to deterioration of the viewfinder image and the metering characteristic. The use of the area type beam splitter alleviates the above-noted problems with the color characteristic and polarizing characteristic. But where the size of the light-transmitting portion is large, the shadow thereof is seen through the viewfinder screen or the viewfinder image is sometimes flared by diffraction or the like and therefore, the size of the light-transmitting portion cannot be made very large and the average transmission factor can not be made very great and is suppressed to about 20% or less. Recently, various cameras in which, although not for the purpose of metering, a digital sensor array such as CCD is installed rearwardly of the beam splitter and receives the imaging light beam and takes out the image information to thereby detect the position of the focus have been proposed as shown, for example, in Japanese Laid-open Patent Application No. 18652/1980. Again in such a case, the use of the area type quick return mirror is considered as in Japanese Laid-open Patent Application No. 105205/1980 because of the ease of manufacture thereof.

However, applicant has found that where image information is to be detected by a digital sensor array having a pitch of 10μ, for example, where the digital sensors are effectively installed on the predetermined imaging plane and at two points before and behind the plane to effect focus detection, low-pass filter means is required between an object to be photographed and the sensors. Applicant has also shown that the MTF (modulation transfer function) of the imaging light beam reaching the sensor surface is controlled by the pattern shape of the transmitting portion of the area type quick return beam splitter to achieve the purpose, and has also proposed a specific pattern.

Figure 1:
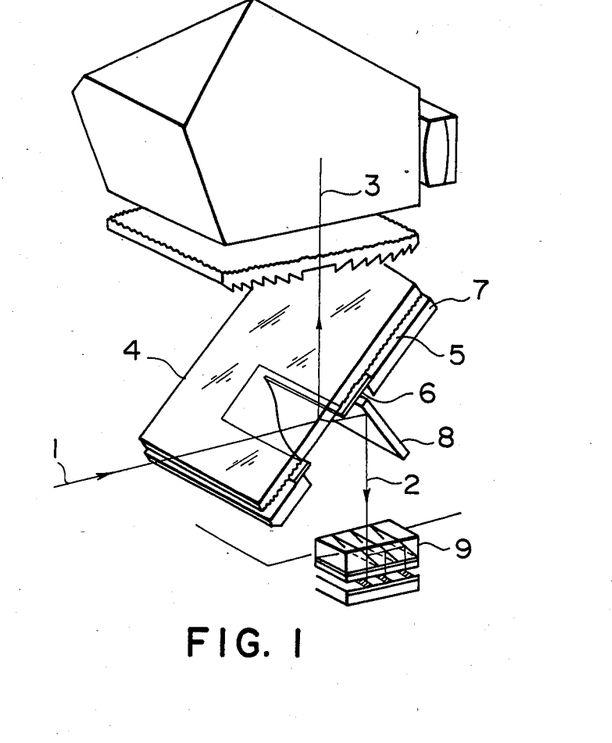
FIG. 1 shows the optical system of the camera with a focus detecting device according to a prior application.

In the case of the focus detection camera by applicant (Japanese Laid-open Patent Application No. 18652/1980), use is made of a blur detecting system and three digital line sensors installed on the predetermined imaging plane and equidistant before and behind the plane, to receive image information and to detect the in-focus state from the comparison between the blurs at the respective positions. Accordingly, if the maner of blurring on the sensor arrays placed equidistant before and behind the predetermined imaging plane differ from each other at the in-focus state, it will adversely affect the accuracy of focus detection. As is well known in the art, in the case of an imaging lens of small FNo such as F1.4 or F1.2, the front blur and the rear blur often differ from each other during the opening under the influence of spherical aberration. For such a case, a method of providing a specially configured opening (see FIG. 1 of the accompanying drawings) at the rear of a half-mirror for the purpose of reducing the rate at which the light passed through the marginal portion of the lens reaches the sensor surface has been devised. In FIG. 1, one half of the light beam from the imaging lens (in FIG. 1, indicated by the on-axis light ray for convenience) 1 is reflected by a whole surface half-mirror 4 and a light beam 3 travelling toward the viewfinder and the remaining one half of the light beam passes through the half-mirror 4 and enters a focus detecting optical system 9. A part of the back of the half-mirror 4, namely, that part through which a light beam does not pass, is provided with a light-absorbing coating material layer 5 so as to prevent ghost from being created by back side reflection. Immediately beind the light-transmitting portion, there is installed a thin mask 6 having an opening approximately of a semicircular shape and the light after being transmitted through the mask is reflected by a sub-mirror 8 and enters a light beam 2 into the system 9 for dividing the light beam into three light beams. The function of the mask having the opening approximately of a semicircular shape will now be described with reference to FIG. 2 of the accompanying drawings.

Figure 2:
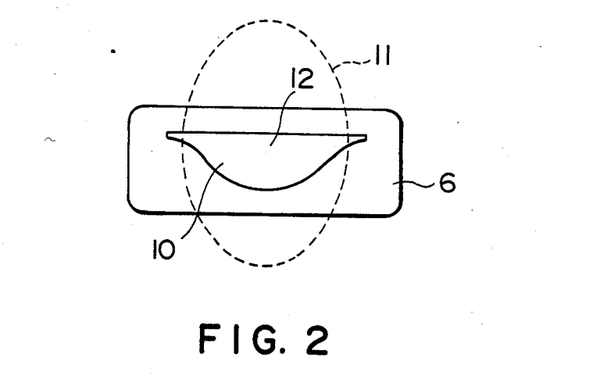
FIG. 2 illustrates the function of the mask of the camera shown in FIG. 1.

Referring to FIG. 2, the mask 6 has a semicircular opening 10 and this shape is such that when a light beam of F1.4 enters along the optical axis 12, the cross-sectional shape of the light beam on the mask surface becomes an ellipse 11 and accordingly, the marginal portion of the light beam is scarcely passed.

The function of the mask 6 can also be provided by carrying out such evaporation on the quick return beam splitter of FIG. 1 that the transmission factor is reduced in the direction away from the optical axis, but this has the disadvantage that the process is cumbersome.

SUMMARY OF THE INVENTION

It is an object of the present invention to provide an area type quick return beam splitter in which digital sensors of pitch 10μ are arranged on or near the predetermined imaging plane of a single lens reflex camera and which is suitable for detecting image information by the sensors.

The present invention further relates to a quick return mirror suitable for use in the camera with a focus detecting device proposed by applicant (Japanese Laid-open Patent Application No. 18625/1980). More specifically, it is an object of the present invention to provide an area type beam splitter in which, like the semicircular opening described with reference to FIG. 2, the difference between the front and rear blurs is reduced.

It is a further object of the prsent invention to provide an area type quick return beam splitter in which, as compared to one where a whole surface half-mirror is used, there is a great quantity of light reflected toward a viewfinder so that the viewfinder is made bright.

It is still a further object of the present invention to provide an area type quick return beam splitter in which both reflected light and transmitted light are hardly affected by polarization as compared to one where a whole surface half-mirror is used.

It is yet still a further object of the present invention to provide an area type quick return beam splitter which eliminates the necessity of carrying out an anti-reflection treatment indicated at 5 in FIG. 1 as compared to one where a whole surface half-mirror is used.

The invention will become fully apparent from the following detailed description thereof taken in conjunction with the accompanying drawings.

BRIEF DESCRIPTION OF THE DRAWINGS

FIG. 4-1 shows the pattern of an area type mirror according to the present invention.

FIG. 4-2 is a partial enlarged view of a mask used when the mirror pattern of FIG. 4-1 is manufactured by mask evaporation.

FIG. 4-3 illustrates the low-pass filter effect of the mirror pattern shown in FIG. 3 or 4-1.

FIG. 4-4 is a graph for illustrating the low-pass filter effect by the MTF curve of the mirror pattern shown in FIG. 3 or 4-1.

DESCRIPTION OF THE PREFERRED EMBODIMENTS

Some embodiments of the present invention will hereinafter be described.

Figure 3:
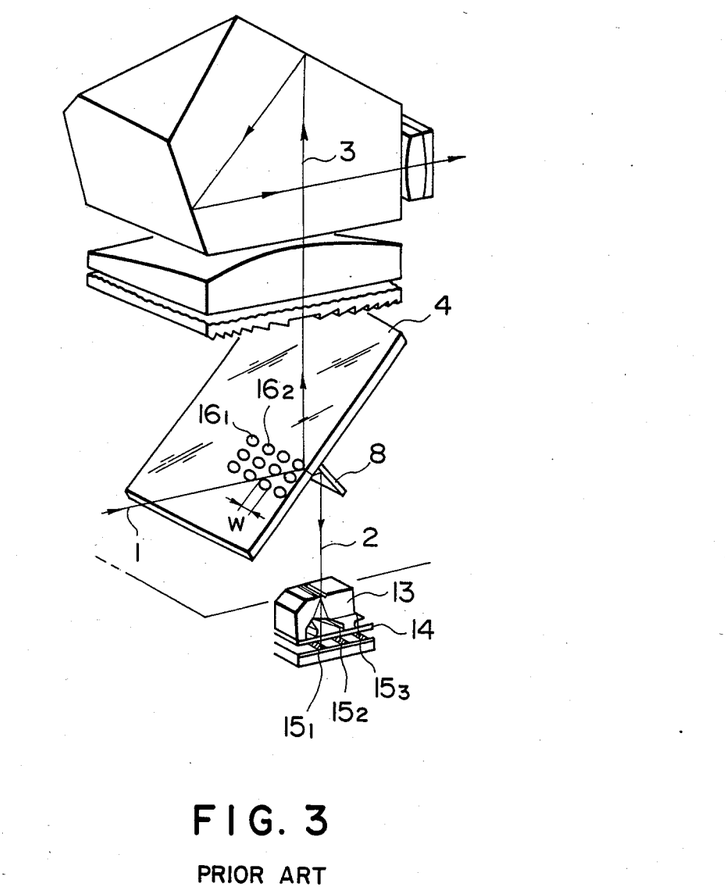
FIG. 3 shows a quick return mirror provided with a low-pass filter for the camera with a focus detecting device. The quick return mirror is of the type also shown in U.S. Patent Application Ser. No. 287,699, in the name of the applicant herein.

FIG. 4 shows an embodiment of the present invention. Description will first be made of an area type beam splitter 4 suitable for use in a focus detecting optical system. In the case of this embodiment, an imaging light beam 2 is divided into three beams by a light divider 13 and directed to three digital sensor arrays arranged with a particular pitch Ps, for example, CCD sensor arrays $15_1$–$15_3$. In this case, the sensors arranged with the pitch Ps cannot properly resolve spatial frequency components of frequencies greater than the nyquist frequency defined by a spatial frequency 2Ps twice the sensor pitch, and this hinders correct reading of information. Therefore, low-pass filter means is required.

Figure 43:
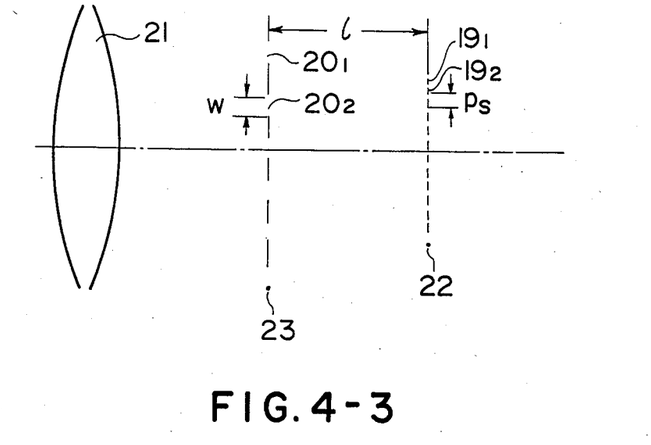
Figure 44:
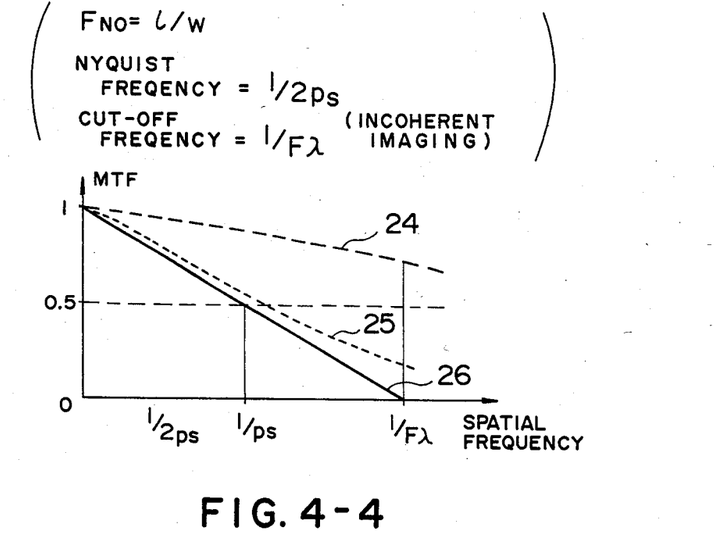

The manner in which the size of circular openings $16_1, 16_2, \ldots$ on the area type beam splitter in FIG. 3 is determined will be described with reference to FIGS. 4-3 and 4-4. In FIG. 4-3, an area type beam splitter surface 23 is disposed between an imaging lens 21 and a sensor array surface 22. Actually, as shown in FIG. 3, the quick return mirror of a single lens reflex camera is obliquely disposed and therefore, it is to be understood that the mirror surface 23 in the case to be described below indicates the condition of a light-transmitting portion at a typical position, for example, in a cross-section in the direction of the horizontal axis intersecting the optical axis. Assuming that openings $20_1$ and $20_2$ exist in the sensor arrangement direction, that the width thereof is w and that the distance from the opening to the sensor array surface having the pitch Ps is l, FNo of an opening is given by FNo=l/w. The cut-off frequency in the incoherent imaging system at said FNo is $$f \text{ cut off} = 1/F\lambda$$

and MTF by the circular opening having a diameter w is the solid line 26 in FIG. 4-4. In the graph of FIG. 4-4, MTF of only the lens is the broken line 24 and, where several circular openings each having a diameter w are arranged in a line as shown in FIG. 4-3, the characteristic becomes better than the MTF characteristic 26 of one circular opening having a diameter w, as indicated by dotted line 25 in FIG. 4-4, although this depends on that diameter and the distance between adjacent openings. Assuming that the sensor pitch is 25μ, $$1/Ps = 40 \text{ lines/mm}, \tfrac{1}{2}Ps = 20 \text{ lines/mm}$$

and MTF of an imaging lens of the order of F2.8–5.6 is usually 60–70% for 40 lines/mm. To endow such an imaging lens with the effect of a low-pass filter, as shown in FIG. 4-4, the following relations may be adopted:

$$2/PS \geq 1/F\lambda (Ps \leq 2F\lambda) \tag{1}$$

$$PS \leq (2l\lambda)/w (w \leq (2l\lambda)/Ps) \tag{2}$$

and therefore, if l=20 mm and λ=0.55μ and Ps=25μ, the diameter w may be w≦0.88 mm (f cut off=80 lines/mm). However, inequality (1), as seen from FIG. 4-4, is based on the premise that MTF of the imaging lens at f cut off=1/Fλ is 50% or more. Inequalities (1) and (2) are rough standards, and the purpose will be achieved if the MTF calculation value (dotted line 25) relative to what is pattern-designed becomes lower than the MTF of the lens (broken line 24). In FIG. 3 which shows an embodiment of the present invention, circular openings $16_1$ and $16_2$ are regularly arranged, whereas circular openings $17_1$ and $17_2$ may be arranged at random as shown in FIG. 4-1. In FIG. 4-1, the portion encircled by a straight line AB and a curve 19 corresponds to the light-transmitting portion 10 of FIG. 2 and has an average transmission factor 50%, and the portion encircled by straight lines AC, CD and DB and the curve 19 comprises a random arrangement of smaller circular openings and considerably reduces MTF, thereby providing the effect of reducing the difference between the front blur and the rear blur of a large aperture lens and increasing the quantity of light passing toward the sensor by an amount corresponding to the quantity of light passing through that portion.

Figure 41:
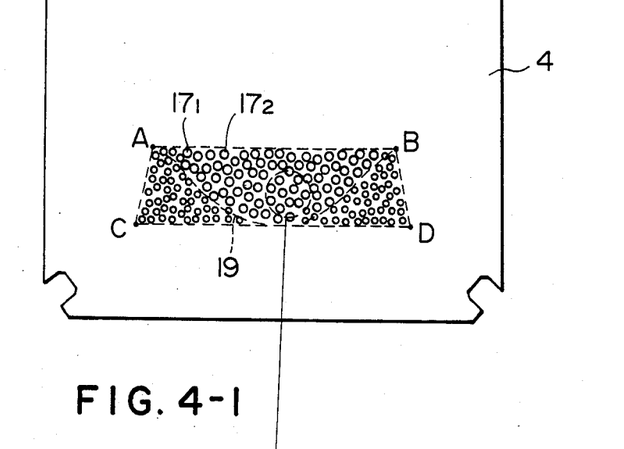
Figure 42:
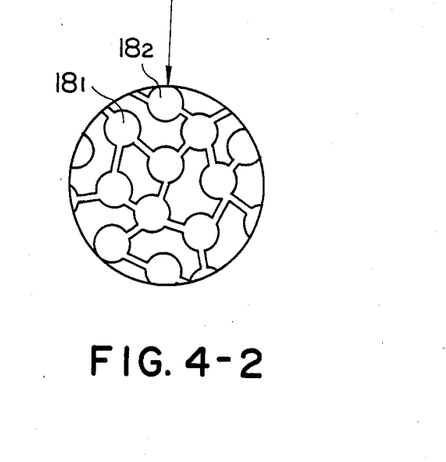

The conventional patterning technique is used to make the circular openings as shown in FIGS. 3 and 4-1 in the mirror surface, but if the diameter of the openings is of the order of 0.6 mm, such circular openings can be made by the use of a mask evaporating technique using a mask having masking discs $18_1$, $18_2$, ... of the same diameter connected by a bridge having a width of the order of 0.1 mm as shown in FIG. 4-2.

Figure 5:
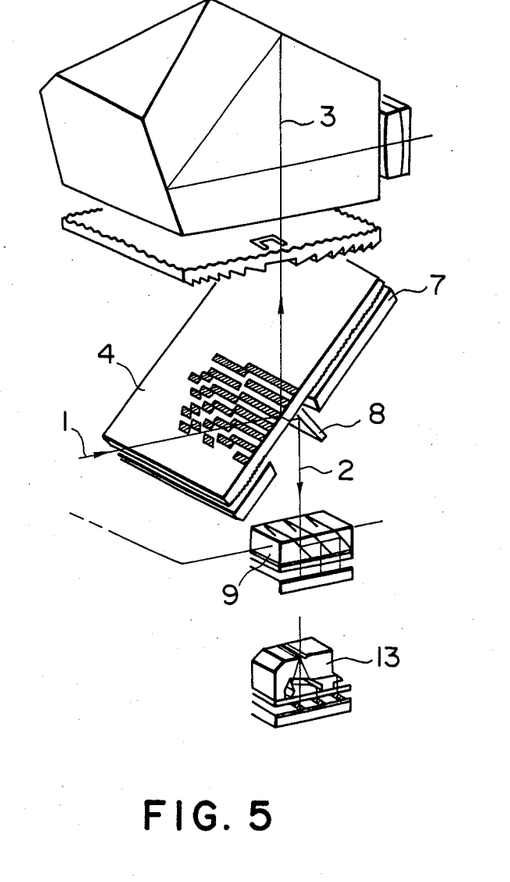
FIG. 5 is a view of an optical system for illustrating another embodiment of the present invention.

Another embodiment of the present invention will now be described with reference to FIG. 5.

Figure 6:
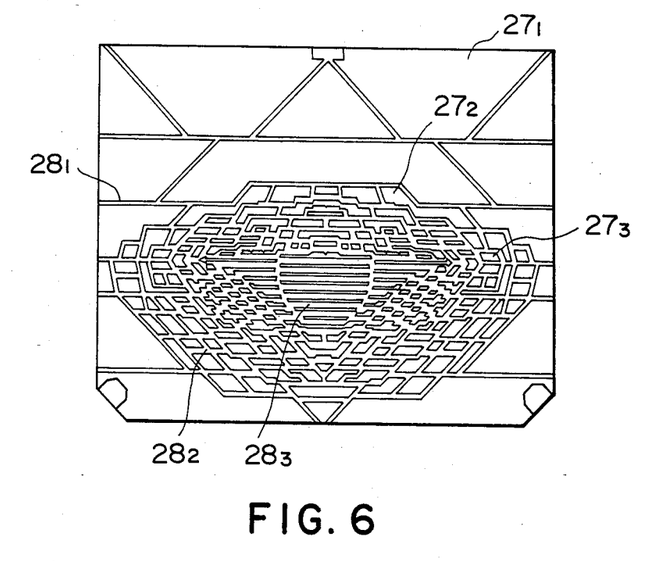
FIGS. 6 and 7 show mirror patterns used in the embodiment of FIG. 5.
Figure 7:
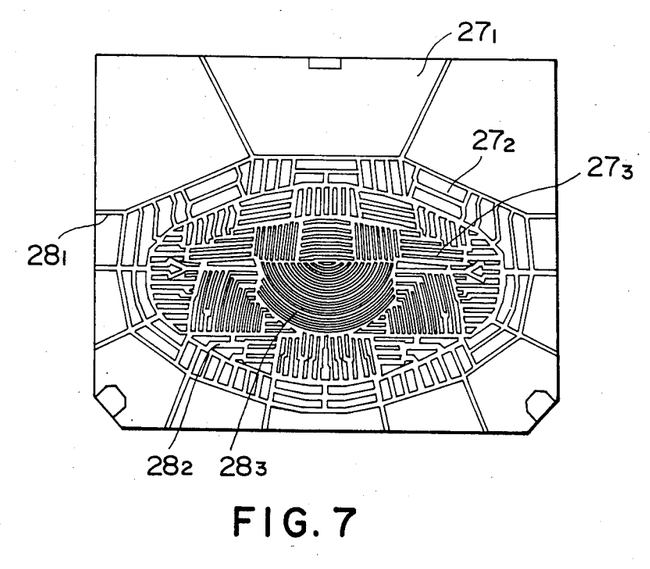

Since the light dividing element already has the effect of a low-pass filter, the area indicated by 10 in FIG. 2 need hardly be endowed with the effect of a low-pass filter and only the marginal portion thereof may be endowed with a strong low-pass effect to increase the quantity of light transmitted toward the sensor. More specific patterns on the mirror surface 4 are shown in FIGS. 6 and 7. In the pattern of FIG. 7, the areas $27_1$–$27_2$, ... encircled by the straight line or curve of FIG. 6 or 7 are light-reflecting areas and the other areas $28_1$–$28_2$, ... are the areas which transmit light therethrough. Thus, the reflecting areas are dispersed within the transmissive areas on the surface 4 and vice versa. In the area type quick return beam splitter of FIG. 6, the portion corresponding to the semicircle of FIG. 4-1 comprises an opening laterally elongated in the sensor arrangement direction and is designed not to reduce the MTF of a light beam of F5.6 reaching the sensor surface with respect to the sensor direction. As regards the portion of the quadrilateral ABCD of FIG. 4-1 except the semicircle, the width of the opening in the sensor direction is reduced so as to reduce the difference between the front and rear blurs, thereby increasing the MTF reducing effect (low-pass effect). As regards the same area, MTF is further reduced in the case of FIG. 7.

In FIGS. 6 and 7, the portion other than the portion corresponding to the quadrilateral ABCD of FIG. 4-1 is also designed to partly transmit light therethrough and this is for the purpose of avoiding the effect that only the light-transmitting portion looks dark when the viewfinder screen surface is seen from the viewfinder. It becomes gradually lighter as the marginal portion is approached and therefore, even if the average transmission factor in the neighborhood of the optical axis is 40–50%, the shading on the screen surface is scarcely conspicuous up to F4 or so.

As is apparent from the foregoing description of the embodiments of the invention, when use is made of the area type quick return beam splitter of the present invention, as compared to one where the conventional whole surface half mirror is used, the quantity of light reflected toward the viewfinder is increased (about 1.5 times) and a bright viewfinder image is obtained and both of the reflected light and the transmitted light are excellent in polarizing characteristic and chromatic characteristic.

Also, in a case where the transmitted light is received by a digital sensor such as CCD to detect image information, the low-pass effect can be obtained by the present area type mirror, and particularly in a case where the difference between the front and rear blurs of the lens is remarkable, the low-pass effect can be accentuated depending on the locations on the mirror surface, thereby reducing the difference therein.

What I claim is:

1. A single lens reflex camera, comprising:
a photo-taking optical system for forming an image of an object to be photographed on an image plane;
a view finder optical system;
sensing means for sensing the sharpness of plural images of the object formed by said photo-taking optical system at different positions on the optical axis of said photo-taking optical system; and
light splitting means, interposed between said photo-taking optical system and the image plane, for splitting the light from said photo-taking optical system into reflective light and transmissive light one of which is directed to said view finder optical system and the other of which is directed to said sensing means, said light splitting means having a light splitting surface with a reflecting portion and a transmitting portion, one of said reflecting and transmitting portions being dispersed within the other, wherein the ratio between said reflecting and transmitting portions is such that a greater part of the light from the central portion as compared to the light from the peripheral portion of said photo-taking optical system is directed to said sensing means.

2. A single lens reflex camera according to claim 1, wherein said sensing means receives the light transmitted through said light splitting means, and wherein the ratio of said transmitting portion relative to said reflecting portion of said light splitting surface is greater in the central portion than in the peripheral portion of said light splitting surface.

3. A single lens reflex camera according to claim 2, wherein said sensing means includes a plurality of arrayed elements, and wherein the width of said transmitting portion of said light splitting means in the direction of the array of said plurality of elements of said sensing means is less in the peripheral portion of said light splitting surface than in the central portion of said light splitting surface.

4. A single lens reflex camera according to claim 2, wherein said transmitting portion of said light splitting means is formed linearly.

5. A single lens reflex camera accordng to claim 2, wherein said sensing means includes a plurality of elements arranged in a predetermined pitch, and wherein the width of said transmitting portion of said light splitting means, in the direction of arrangement of said plurality of elements, is determined so that the modulation transfer function (MTF) of a portion of said elements of said sensing means in the direction of arrangement thereof is lower compared to the modulation transfer function (MTF) of said photo-taking optical system.

6. An optical system for use in an apparatus for sensing the sharpness of an image comprising:
an imaging optical system;
an array sensor for sensing an image formed by said imaging optical system, said array sensor being disposed on the optical axis of said imaging optical system and extending in one direction; and
light splitting means for splitting the light from said imaging optical system into reflective light and transmissive light, said light splitting means having a light splitting surface with a stripe-shaped reflecting portion extending in the one direction in which said array sensor extends and a stripe-shaped transmitting portion extending the one direction in which said array sensor extends, one of said reflecting and transmitting portions being dispersed within the other, wherein the ratio between said reflecting and transmitting portions is such that a greater part of the light from the central portion as compared to the light from the peripheral portion of said imaging optical system is directed to said sensing means.

* * * * *

UNITED STATES PATENT AND TRADEMARK OFFICE
CERTIFICATE OF CORRECTION

PATENT NO. : 4,557,580
DATED : December 10, 1985
INVENTOR(S) : TAKASHI SUZUKI

It is certified that error appears in the above-identified patent and that said Letters Patent is hereby corrected as shown below:

Column 1, line 13, change "and in" to --and, in--; and
                   line 46, change "can not" to --cannot--.

Column 2, line 10, change "maner" to --manner--;
                   line 23, change "one half" to --one-half--;
                   line 28, change "one half" to --one-half--; and
                   line 38, change "enters a light beam" to --enters as a light beam--.

Column 3, line 3, change "prsent" to --present--;
                   line 51, change "FIG. 4" to --FIG. 3--; and
                   line 61, change "2Ps twice" to --2Ps, twice--.

Column 4, line 15, change "cut off" to --cut-off--;
                   line 40, change "cut off" to --cut-off--;
                   line 43, change "cut off" to --cut-off--; and
                   line 55, change "factor 50%," to --factor of 50%,--.

UNITED STATES PATENT AND TRADEMARK OFFICE
CERTIFICATE OF CORRECTION

PATENT NO. : 4,557,580

DATED : December 10, 1985

INVENTOR(S) : TAKASHI SUZUKI

It is certified that error appears in the above-identified patent and that said Letters Patent is hereby corrected as shown below:

Column 5, line 14, change "$27_1$-$27_2$," to --$27_1$-$27_3$,--;

line 16, change "$28_1$-$28_2$," to --$28_1$-$28_3$,--;

line 48, change "half mirror" to --half-mirror--; and line 66, change "view finder" to --viewfinder--.

Column 6, line 7, change "view finder" to --viewfinder--;

line 36, change "accordng" to --according-- and line 59, change "extending the" to --extending in the--.

In the abstract, line 4, change "view-finder" to --viewfinder--.

Signed and Sealed this

Ninth Day of September 1986

[SEAL]

Attest:

DONALD J. QUIGG

Attesting Officer

Commissioner of Patents and Trademarks